(No Model.) 3 Sheets—Sheet 1.
B. C. BRADLEY.
VINEYARD PLOW.
No. 299,050. Patented May 20, 1884.
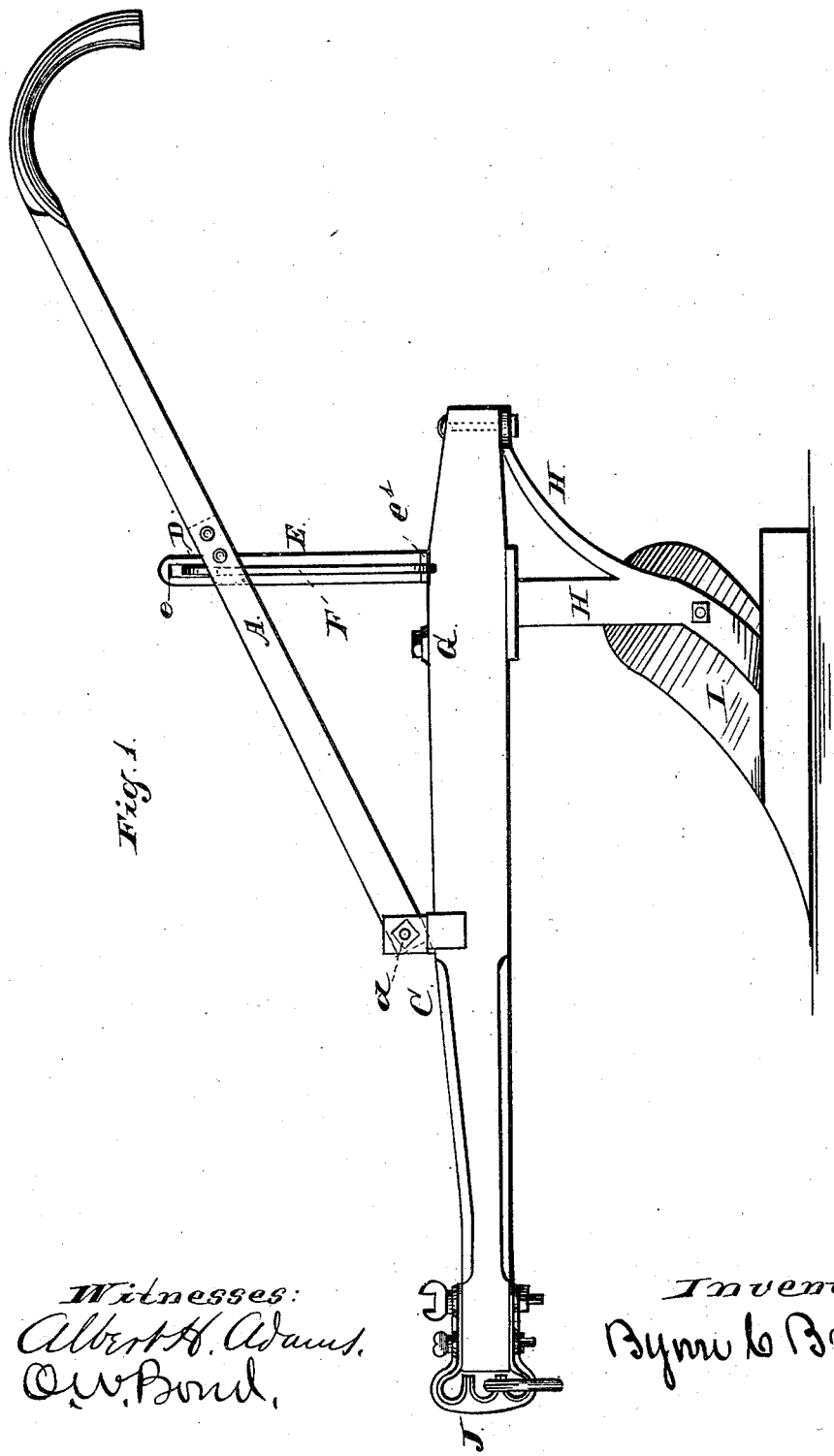

(No Model.) 3 Sheets—Sheet 2.
B. C. BRADLEY.
VINEYARD PLOW.
No. 299,050. Patented May 20, 1884.
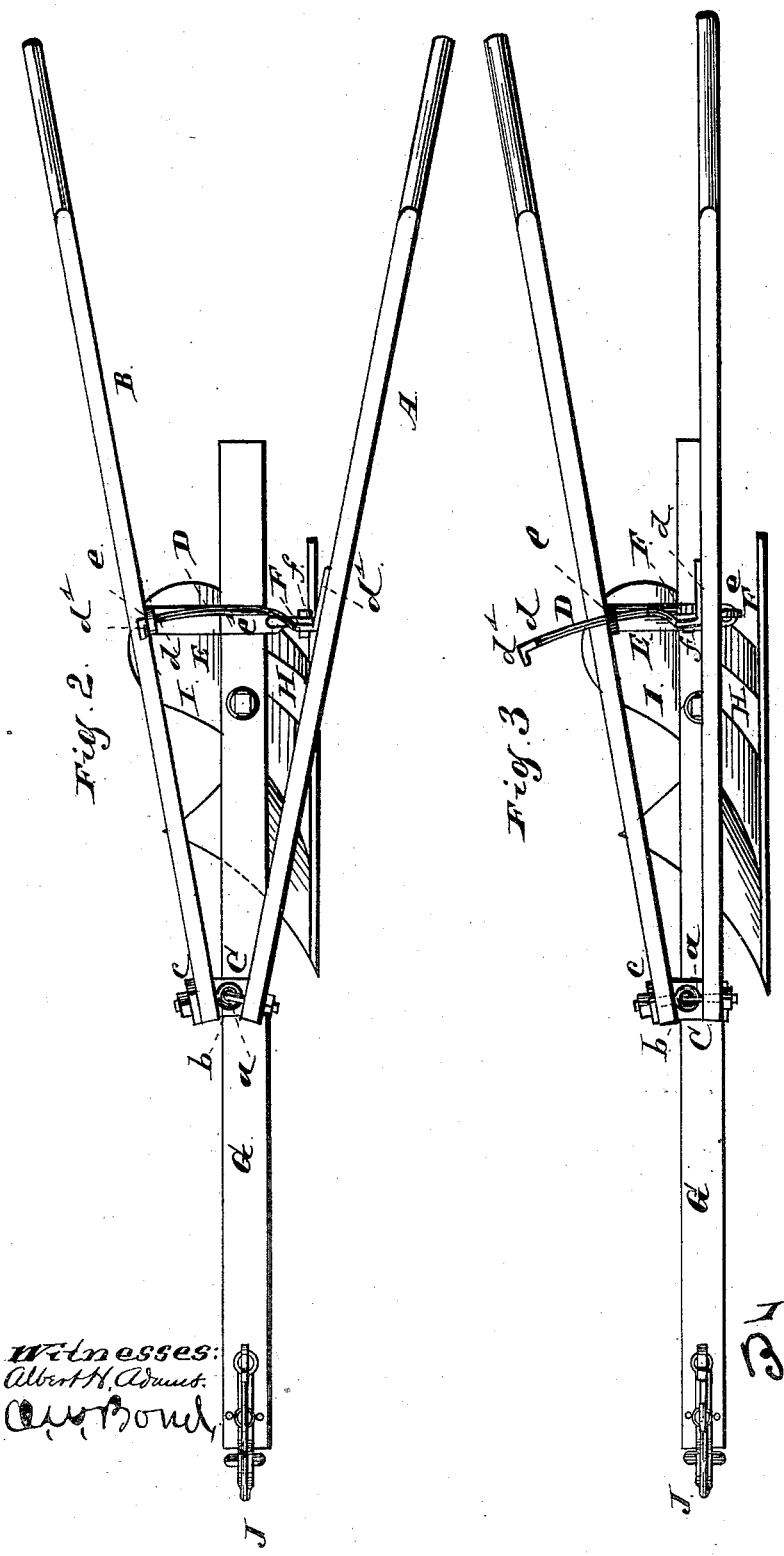
Witnesses:
Albert H. Adams.
Inventor:
Byron C. Bradley (No Model.)  3 Sheets—Sheet 3.
B. C. BRADLEY.
VINEYARD PLOW.
No. 299,050. Patented May 20, 1884.
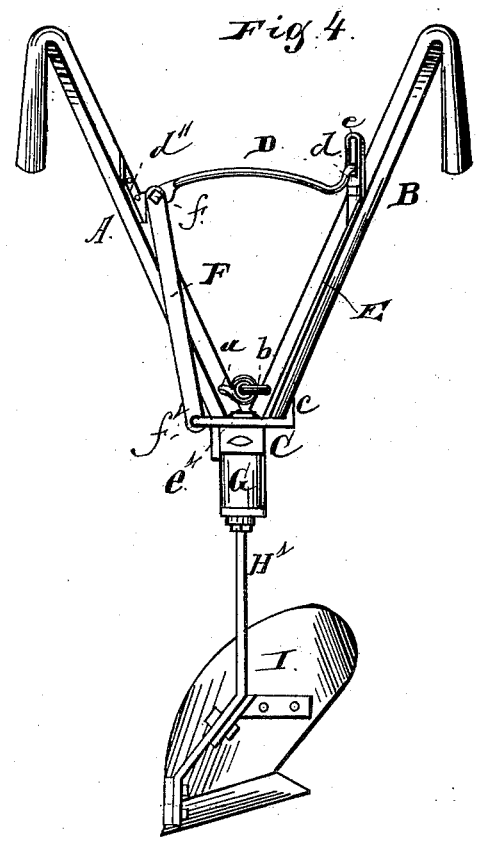
Witnesses:
Albert H. Adams
O. W. Bond
Inventor:
Byron C. Bradley

UNITED STATES PATENT OFFICE.

BYRON C. BRADLEY, OF CHICAGO, ILLINOIS, ASSIGNOR TO FURST & BRADLEY MANUFACTURING COMPANY, OF SAME PLACE.

VINEYARD-PLOW.

SPECIFICATION forming part of Letters Patent No. 299,050, dated May 20, 1884.

Application filed January 14, 1884. (No model.)

*To all whom it may concern:*

Be it known that I, BYRON C. BRADLEY, residing at Chicago, in the county of Cook and State of Illinois, and a citizen of the United States, have invented a new and useful Improvement in Vineyard-Plows, of which the following is a full description, reference being had to the accompanying drawings, in which—

Figure 1 is a side elevation; Fig. 2, a top or plan view showing the movable handle open; Fig. 3, a top or plan view showing the movable handle closed; Fig. 4, a rear end elevation; Fig. 5, a detail showing the manner of attaching the plow-standard to the under side of the beam.

The cultivation of vineyards requires the earth to be loosened close to the roots of the vine, and to do this with the vineyard-plows as now constructed is objectionable, for the reason that the handle which is adjacent to the vines projects out beyond the line of plowing on the land side so as to come in contact with the vines and injure them; and the object of this invention is to obviate this objection and difficulty in the cultivation of the vines by the plows; and its nature consists in providing a movable handle on that side of the plow adjacent to the vines, which can be opened out and occupy the ordinary position of plow-handles, or be closed up, so as to lie within the landside, all as hereinafter more specifically described, and pointed out in the claims.

In the drawings, A represents the movable handle, made of wood or other suitable material, as usual.

B is the stationary handle, similar in construction to the handle A. The handle A is located on the landside of the plow, and the handle B on the mold-board side, and their inner ends are connected by eyebolts $a\,b$, as shown in Figs. 2, 3, and 4.

C is a plate bolted or otherwise secured to the top of the plow-beam, and having one end turned up to form an ear, $c$, to which ear the inner end of the handle B is firmly secured by its eyebolt $b$, so that this handle is held stationary at this point. The other end of the plate C is left open, allowing the inner end of the handle A to turn on the hinged connection formed by the eyebolts $a\,b$.

D is a spring-rod made of steel or other suitable material, and having, as shown, an upward bow or bend its entire length. One end of this rod is flattened out, so as to form a plate, D″, which is bolted or otherwise secured to the inner face of a handle, A, and the other end is left free, and has an upward-bent portion, $d$, which is turned at its end horizontal and then turned sidewise, to form a stop, $d'$, as shown in Figs. 2, 3, and 4, forming a lock by which, in connection with a suitable catch on the handle B, the handle A is held open or extended sidewise.

E is a metal bar having its lower end, $e'$, turned at right angles and bolted to the top of the plow-beam, and having its main or body portion bolted or otherwise secured to the inner face of the handle B, and its upper end, $e$, is turned so as to stand vertical, or nearly so, in relation to the handle B; and this end $e$ is provided with a slot through which the end $d$ of the spring-rod D can pass. When the handle A is open, the upturned end $d$ is on one side, and the end $d'$ on the other side, of the end $e$ of the plate E, furnishing a lock for the spring brace or rod D.

F is a plate, the upper end of which is pivotally connected by a suitable pin or bolt, $f$, to the end of the rod D, adjacent to the handle A, and the lower end of which is provided with a hole, $f'$, by which connection is made with the end $e'$ of the plate E, by which means the plate F forms a brace for the handle A when open, and at the same time, by reason of its pivotal attachment, allows the handle to be closed, as shown in Fig. 3. G, an ordinary plow-beam; H H′, the plow-standard; I, the plow; J, the clevis to which the team is hitched. These parts G, H, H′, I, and J may be of the ordinary construction and arrangement for vineyard-plows.

When plowing away from the vines, the handles are left in their extended position, as shown in Figs. 2 and 4, but when plowing close to the vines the handle A is closed up or folded inward, as shown in Fig. 3, which brings the handle inside of the landside, allowing the plow to be run very close to the vines without injurious effects from the handle. When open or extended, as shown in Fig. 2, the spring rod or brace D has its free end $d\ d'$ engaged with the end $e$, forming a lock by which the handles are maintained apart with the same rigidity as if the handle A were not movable; and to disengage the lock and close the handle A, the operator bears down upon the end of the handle, which throws the free end of the spring D upward, disengaging the catch $d\ d'$ and allowing the end of the rod D to be passed through the hole or slot in the end $e$; and the necessary fulcrum for bringing the free end of the rod D up by bearing down on the handle is furnished by the inner lower corner of the handle A, which is on the plate C, as shown in Fig. 1, and the hinge formed by the eyebolts $a\ b$ allows the handle to be folded or closed up, and at the same time these eyebolts, when the handles are extended, do not have sufficient play to interfere with the rigidity of the handles in use.

As shown in Fig. 5, the upper end of the standard H is provided with a plate, $g$, having at each end a curved slot, $h$, through which bolts or screws $h'$ pass attaching the standard to the under face of the beam, so that the set of the plow can be adjusted at the point or heel, or both, as may be desired for use.

What I claim as new, and desire to secure by Letters Patent, is—

1. The hinged handle A, in combination with the spring brace or rod D, for maintaining the handle in its extended position and allowing it to be folded, substantially as and for the purpose specified.

2. The hinged handle A and spring brace or rod D, in combination with the bar E and pivoted bar F, substantially as and for the purpose specified.

3. The hinged handle A, stationary handle B, and spring brace or rod D, in combination with the stationary bar E, pivoted bar F, and plow-beam G, substantially as and for the purpose specified.

BYRON C. BRADLEY.

Witnesses:
 O. W. BOND,
 ALBERT H. ADAMS.